US009040450B2

(12) United States Patent
Miyaki et al.

(10) Patent No.: US 9,040,450 B2
(45) Date of Patent: May 26, 2015

(54) PROCESS FOR PRODUCING COMPOSITE OXIDE CATALYST

(75) Inventors: Kenichi Miyaki, Otake (JP); Motoo Yanagita, Yokohama (JP); Hirokazu Watanabe, Yokohama (JP); Takashi Karasuda, Yokohama (JP)

(73) Assignee: Dia-Nitrix Co., Ltd., Tokyo (JP)

( * ) Notice: Subject to any disclaimer, the term of this patent is extended or adjusted under 35 U.S.C. 154(b) by 0 days.

(21) Appl. No.: 13/500,760

(22) PCT Filed: Sep. 10, 2010

(86) PCT No.: PCT/JP2010/065635
§ 371 (c)(1),
(2), (4) Date: Apr. 6, 2012

(87) PCT Pub. No.: WO2011/043157
PCT Pub. Date: Apr. 14, 2011

(65) Prior Publication Data
US 2012/0196744 A1    Aug. 2, 2012

(30) Foreign Application Priority Data

Oct. 9, 2009  (JP) ................................. 2009-235560

(51) Int. Cl.
| B01J 23/70 | (2006.01) |
| B01J 35/02 | (2006.01) |
| B01J 23/00 | (2006.01) |
| B01J 23/843 | (2006.01) |
| B01J 23/888 | (2006.01) |
| B01J 27/057 | (2006.01) |
| B01J 37/00 | (2006.01) |
| B01J 37/03 | (2006.01) |
| B01J 21/08 | (2006.01) |

(52) U.S. Cl.
CPC ............... *B01J 35/023* (2013.01); *B01J 21/08* (2013.01); *B01J 23/002* (2013.01); *B01J 23/8435* (2013.01); *B01J 23/888* (2013.01); *B01J 23/8885* (2013.01); *B01J 27/0576* (2013.01); *B01J 37/0045* (2013.01); *B01J 37/03* (2013.01); *B01J 2523/00* (2013.01)

(58) Field of Classification Search
CPC .... B01J 35/023; B01J 23/8885; B01J 23/002; B01J 37/03; B01J 23/8435; B01J 37/0045; B01J 23/888; B01J 27/0576; B01J 21/08; B01J 2523/00
USPC .......................................................... 502/338
See application file for complete search history.

(56) References Cited

U.S. PATENT DOCUMENTS

| 3,988,359 A | 10/1976 | Saito et al. | |
| 5,132,269 A * | 7/1992 | Sasaki et al. | 502/205 |
| 5,422,328 A * | 6/1995 | Ushikubo et al. | 502/312 |
| 6,171,998 B1 * | 1/2001 | Lee et al. | 502/304 |
| 6,740,620 B2 | 5/2004 | Bogan, Jr. et al. | |
| 2004/0176244 A1 | 9/2004 | Bogan, Jr. et al. | |
| 2005/0245761 A1 | 11/2005 | Bogan, Jr. et al. | |
| 2006/0047137 A1 * | 3/2006 | Tu et al. | 558/338 |
| 2006/0052634 A1 | 3/2006 | Bogan, Jr. et al. | |
| 2006/0194693 A1 | 8/2006 | Watanabe et al. | |
| 2007/0100155 A1 | 5/2007 | Bogan, Jr. et al. | |

FOREIGN PATENT DOCUMENTS

| EP | 0340909 A1 | 11/1989 |
| EP | 0404529 A1 | 12/1990 |
| EP | 0475351 A1 | 3/1992 |
| EP | 0750942 A2 | 1/1997 |
| EP | 2100663 A1 | 9/2009 |
| JP | 38-19111 | 9/1963 |
| JP | 46-2804 | 1/1971 |
| JP | 47-18722 | 5/1972 |
| JP | 47-19765 | 6/1972 |
| JP | 47-19766 | 6/1972 |
| JP | 47-19767 | 6/1972 |
| JP | 49-40288 | 4/1974 |
| JP | 50-108219 | 8/1975 |
| JP | 52-140490 | 11/1977 |
| JP | 58-145617 | 8/1983 |
| JP | 60-137438 | 7/1985 |
| JP | 1-257125 | 10/1989 |
| JP | 1-265068 | 10/1989 |
| JP | 3-26342 | 2/1991 |
| JP | 4-118051 | 4/1992 |
| JP | 6-285372 | 10/1994 |
| JP | 2001-114740 | 4/2001 |
| JP | 2002-306970 | 10/2002 |
| JP | 2003-24787 | 1/2003 |
| JP | 2004-268027 | 9/2004 |
| JP | 2004-313992 | 11/2004 |

OTHER PUBLICATIONS

International Search Report issued Dec. 7, 2010, in PCT/JP2010/065635 with English translation.
European Search Report Issued Mar. 14, 2013, in EP Application No. 10821828.0.

* cited by examiner

*Primary Examiner* — Colleen Dunn
*Assistant Examiner* — Haytham Soliman
(74) *Attorney, Agent, or Firm* — Oblon, McClelland, Maier & Neustadt, L.L.P.

(57) ABSTRACT

A process for producing a composite oxide catalyst which includes a step of preparing an aqueous slurry containing at least iron and antimony and composed of a liquid phase and a solid phase, a step of drying the aqueous slurry to obtain a dried material, and a step of calcining the obtained dried material, wherein of the precipitated particles having a particle size of not less than 1 μm but less than 150 μm contained within the aqueous slurry, the proportion of precipitated particles having a particle size of not less than 1 μm but less than 10 μm is within a range from 40 to 90% by volume, and the proportion of precipitated particles having a particle size of not less than 10 μm but less than 150 μm is within a range from 10 to 60% by volume.

12 Claims, No Drawings

PROCESS FOR PRODUCING COMPOSITE OXIDE CATALYST

TECHNICAL FIELD

The present invention relates to a process for producing a composite oxide catalyst containing at least iron and antimony.

Priority is claimed on Japanese Patent Application No. 2009-235560, filed Oct. 9, 2009, the content of which is incorporated herein by reference.

BACKGROUND ART

Antimony-containing composite oxide catalysts are widely known as catalysts for the production of aldehydes and unsaturated acids by oxidation reactions of organic compounds, and the production of nitriles and hydrocyanic acid by ammoxidation reactions. Antimony-containing composite oxide catalysts are particularly useful for ammoxidation reactions, and are used, for example, in the production of acrylonitrile by ammoxidation of propylene, and in the production of hydrocyanic acid by ammoxidation of methanol.

Numerous investigations have already been conducted into catalysts for use in oxidation reactions and ammoxidation reactions, and a great variety of catalysts have been proposed.

For example, Patent Document 1 discloses a composite oxide catalyst of antimony and at least one element selected from the group consisting of iron, cobalt and nickel.

Investigations into improving these catalysts are also being actively pursued, and for example, Patent Documents 2 to 11 discloses catalysts in which tellurium, vanadium, tungsten, molybdenum or phosphorus or the like is added to the iron and antimony.

Moreover, investigations continue to be conducted into improving the yield of the target product by improving the catalyst preparation process. For example, Patent Documents 12 to 16 disclose a process for adjusting the pH of a slurry containing antimony and polyvalent metal compound, and a process for heat-treating a slurry and the like.

PRIOR ART DOCUMENTS

Patent Documents

[Patent Document 1]
Japanese Examined Patent Application, Second Publication No. Sho 38-19111
[Patent Document 2]
Japanese Examined Patent Application, Second Publication No. Sho 46-2804
[Patent Document 3]
Japanese Examined Patent Application, Second Publication No. Sho 47-19765
[Patent Document 4]
Japanese Examined Patent Application, Second Publication No. Sho 47-19766
[Patent Document 5]
Japanese Examined Patent Application, Second Publication No. Sho 47-19767
[Patent Document 6]
Japanese Unexamined Patent Application, First Publication No. Sho 50-108219
[Patent Document 7]
Japanese Unexamined Patent Application, First Publication No. Sho 58-145617
[Patent Document 8]
Japanese Unexamined Patent Application, First Publication No. Hei 01-257125
[Patent Document 9]
Japanese Unexamined Patent Application, First Publication No. Hei 03-26342
[Patent Document 10]
Japanese Unexamined Patent Application, First Publication No. Hei 04-118051
[Patent Document 11]
Japanese Unexamined Patent Application, First Publication No. 2001-114740.
[Patent Document 12]
Japanese Examined Patent Application, Second Publication No. Sho 47-18722
[Patent Document 13]
Japanese Unexamined Patent Application, First Publication No. Sho 49-40288
[Patent Document 14]
Japanese Unexamined Patent Application, First Publication No. Sho 52-140490
[Patent Document 15]
Japanese Unexamined Patent Application, First Publication No. Sho 60-137438
[Patent Document 16]
Japanese Unexamined Patent Application, First Publication No. Hei 01-265068

DISCLOSURE OF INVENTION

Problems to be Solved by the Invention

However, although these catalysts of the conventional technology exhibit some effect in terms of improving the yield of the target product, this effect is still insufficient, and further improvement is desirable from an industrial viewpoint.

The present invention takes the above circumstances into consideration, with an object of providing a process for producing a composite oxide catalyst that can produce a target product in high yield.

Means to Solve the Problems

A process for producing a composite oxide catalyst according to the present invention includes a step of preparing an aqueous slurry containing at least iron and antimony and composed of a liquid phase and a solid phase, a step of drying the aqueous slurry to obtain a dried material, and a step of calcining the obtained dried material, wherein of the precipitated particles having a particle size of not less than 1 μm but less than 150 μm contained within the aqueous slurry, the proportion of precipitated particles having a particle size of not less than 1 μm but less than 10 μm is within a range from 40 to 90% by volume, and the proportion of precipitated particles having a particle size of not less than 10 μm but less than 150 μm is within a range from 10 to 60% by volume.

Effect of the Invention

According to the present invention, a composite oxide catalyst is obtained that can produce a target product in high yield.

MODES FOR CARRYING OUT THE INVENTION

A more detailed description of the present invention is presented below.

The process for producing a composite oxide catalyst according to the present invention (hereinafter also referred to as "the catalyst production process of the present invention") includes a step of preparing an aqueous slurry containing at least iron and antimony and composed of a liquid phase and a solid phase (aqueous slurry preparation step), a step of drying the aqueous slurry to obtain a dried material (drying step), and a step of calcining the obtained dried material (calcination step), wherein of the precipitated particles having a particle size of not less than 1 μm but less than 150 μm contained within the aqueous slurry, the proportion of precipitated particles having a particle size of not less than 1 μm but less than 10 μm is within a range from 40 to 90% by volume, and the proportion of precipitated particles having a particle size of not less than 10 μm but less than 150 μm is within a range from 10 to 60% by volume.

In the catalyst production process of the present invention, first, in the slurry preparation step, the raw materials of the components that constitute the catalyst, such as the iron and antimony, are mixed together to prepare an aqueous slurry composed of a liquid phase and a solid phase. Subsequently, in the drying step, the thus obtained aqueous slurry is dried to obtain a dried material.

As a result of intensive investigation, the inventors of the present invention discovered that by controlling, within specific ranges, the particle sizes of the precipitated particles within the aqueous slurry supplied to the drying step, a catalyst could be obtained that enabled the target product to be produced in high yield, and they were thus able to complete the present invention.

In other words, of the precipitated particles having a particle size of not less than 1 μm but less than 150 μm contained within the aqueous slurry supplied to the drying step, the lower limit for the proportion of precipitated particles having a particle size of not less than 1 μm but less than 10 μm is 40% by volume, and preferably 45% by volume, whereas the upper limit is 90% by volume, and preferably 85% by volume. Further, the lower limit for the proportion of precipitated particles having a particle size of not less than 10 μm but less than 150 μm is 10% by volume, and preferably 15% by volume, whereas the upper limit is 60% by volume, and preferably 55% by volume.

Among the precipitated particles having a particle size of not less than 1 μm but less than 150 μm, if the proportion of precipitated particles having a particle size of not less than 1 μm but less than 10 μm is lower than the aforementioned lower limit, or the proportion of precipitated particles having a particle size of not less than 10 μm but less than 150 μm is higher than the aforementioned upper limit, then the catalytic activity and the yield of the target product tend to decrease. Further, physical problems such as reductions in the bulk density and particle strength of the obtained catalyst may also occur. Moreover, if the proportion of particles having a large particle size is excessively large, then problems such as settling of the precipitated particles within the feed line during transport of the aqueous slurry also become more likely.

Among the precipitated particles having a particle size of not less than 1 μm but less than 150 μm, if the proportion of precipitated particles having a particle size of not less than 1 μm but less than 10 μm is higher than the aforementioned upper limit, or the proportion of precipitated particles having a particle size of not less than 10 μm but less than 150 μm is lower than the aforementioned lower limit, then the yield of the target product tends to fall. The decrease in the yield of the target product is particularly marked when the reaction is performed under conditions of high reaction pressure.

If excessively large precipitated particles having a particle size of 150 μm or more exist within the aqueous slurry supplied to the drying step, then the yield of the target product tends to decrease, and the bulk density and particle strength of the obtained catalyst may deteriorate. Further, problems such as settling of the precipitated particles within the feed line during transport of the aqueous slurry also become more likely. Accordingly, in those cases where excessively large particles having a particle size of 150 μm or more exist within the aqueous slurry, these particles are preferably reduced in size by crushing, or removed by filtration. The proportion of precipitated particles having a particle size of 150 μm or more is preferably not more than 5% by volume, and more preferably 3% by volume or less, relative to the volume of the precipitated particles having a particle size of not less than 1 μm but less than 150 μm.

There are no particular limitations on precipitated particles having a particle size of less than 1 μm. For example, in those cases where a silica (silica sol) is used as a catalyst raw material in addition to the iron and antimony, a large amount of precipitated particles having a particle size of less than 1 μm can easily be included in the slurry, but the amount added of the silica sol should be altered appropriately with due consideration of the catalytic activity. In terms of other active components besides silica, the inclusion of a large amount of precipitated particles having a particle size of less than 1 μm may cause problems such as a deterioration in the yield of the target product or increased difficulty in controlling the catalytic activity.

The particle sizes of the precipitated particles within the aqueous slurry can be measured using any conventional method. Examples of measurement methods that may be used include laser diffraction methods, dynamic scattering methods, centrifugation methods, and electrical detection methods.

Examples of methods for controlling the particle sizes of the precipitated particles are outlined below.

For example, in those cases where the raw materials are dispersed or dissolved, and the resulting dispersions or solutions are mixed together to generate the precipitated particles, a method may be used in which the concentration, temperature or pH or the like of the dispersions or solutions is set within a specific range at the time of mixing. In those cases where the raw materials are used in the form of solids, a method may be used in which the particle sizes of the solid raw materials are controlled by crushing or the like. In addition, the particles sizes of the precipitated particles can also be altered by adjusting the mixing intensity or mixing time for the aqueous slurry.

Further, the particle sizes of the precipitated particles can also be controlled by subjecting the aqueous slurry to an aging or heating treatment. Furthermore, methods in which the solid particles within the aqueous slurry are subjected to a particle size reduction treatment using a homogenizer or a fine mill or the like, or in which the aqueous slurry is subjected to an ultrasonic treatment are also effective. However, if a particle size reduction treatment is performed excessively, then there is a possibility that the proportion of precipitated particles having a particle size of not less than 1 μm but less than 10 μm may be increased more than is necessary. Further, in terms of other active components besides silica, it is undesirable for the amount of precipitated particles having a particle size of less than 1 μm to become too large. Accordingly, in order to prevent excessive crushing of the precipitated particles, any particle size reduction treatment is preferably performed with appropriate monitoring of the particle size of the precipitated particles.

In the aqueous slurry preparation step, provided the aforementioned conditions relating to the particle sizes of the precipitated particles within the aqueous slurry are satisfied, there are no particular limitations on any other conditions, and conventional preparation methods may be selected and used as appropriate.

There are no particular limitations on the catalyst raw materials used in preparing the aqueous slurry, and examples of materials that may be used include oxides of the various elements, or salts that can be easily converted to oxides by heating, such as nitrates, carbonates, organic acid salts, ammonium salts, hydroxides and halides. A plurality of these materials may also be used in combination.

Examples of raw materials that may be used for the aforementioned iron component include ferrous oxide, ferric oxide, ferrous nitrate, ferric nitrate, iron sulfate, iron chloride, organic acid salts of iron and iron hydroxide, or alternatively, metallic iron may be dissolved in heated nitric acid.

Examples of raw materials that may be used for the aforementioned antimony component include oxides such as antimony trioxide and antimony pentoxide, as well as antimony chloride and antimony sulfate and the like.

Besides the iron and antimony components described above, a silica is preferably also used as one of the catalyst raw materials.

A silica sol is preferred as the raw material for the silica component, and this silica sol may be selected appropriately from commercially available sols.

Although there are no particular limitations on the silica particle size within the silica sol, the average particle size is preferably within a range from 2 to 100 nm, and more preferably from 5 to 75 nm. The silica sol may contain silica particles of uniform size, or may be a mixture of a plurality of different silica particle sizes. Further, a mixture of a plurality of silica sols having different average particle sizes or pH values or the like may also be used.

The composite oxide catalyst containing iron and antimony that the catalyst production process of the present invention aims to produce may include other catalyst components besides the iron, antimony and silica components described above. In those cases where the composite oxide catalyst does include other catalyst components, examples of raw materials that may be used for the other catalyst components include oxides of the catalyst components, or salts that can be easily converted to oxides by strong heating, such as chlorides, sulfates, nitrates, ammonium salts, carbonates, hydroxides, organic acid salts, oxyacids, oxyacid salts, heteropolyacids, heteropolyacid salts, and mixtures thereof.

These raw material compounds may be mixed within an aqueous medium in the form of a solid, a solution or a slurry or the like to obtain the targeted aqueous slurry. Examples of the aqueous medium include water and nitric acid.

The aforementioned aqueous slurry need not necessarily include all of the elements that constitute the catalyst, and the raw materials for these elements not included within the aqueous slurry may be added during any step up to and including the drying step, or may be added via a method that involves impregnation or the like of the dried catalyst.

Next, the aqueous slurry is dried in the drying step. This yields a dried material (catalyst precursor).

There are no particular limitations on the drying method used, and any conventional method may be selected and used as appropriate.

The composite oxide catalyst produced by the catalyst production process of the present invention is preferably used as a fluidized bed catalyst, and in such cases, spray drying is preferably used to obtain spherical particles. When spray drying is performed, various spray dryers including pressure nozzle spray dryers, two-fluid nozzle spray dryers and rotating disk spray dryers may be used.

During the aforementioned spray drying, in terms of the temperature of the hot air circulated through the drying chamber of the spray dryer, the lower limit for the temperature in the vicinity of the inlet into the drying chamber is preferably 130° C., and more preferably 140° C., whereas the upper limit is preferably 400° C., and more preferably 380° C. Further, the lower limit for the temperature in the vicinity of the outlet from the drying chamber is preferably 100° C., and more preferably 110° C., whereas the upper limit is preferably 250° C., and more preferably 230° C. Moreover, the difference between the temperature in the vicinity of the inlet into the drying chamber and the temperature in the vicinity of the outlet is preferably held within a range from 20 to 250° C., and more preferably within a range from 30 to 230° C.

If any of the above temperatures falls outside the respective range described above, then various problems may occur, including a reduction in the activity of the obtained catalyst or the yield of the target product, or a decrease in the bulk density or particle strength of the catalyst particles.

Further, the particle size of the obtained catalyst is preferably within a range from 5 to 200 μm, and more preferably within a range from 10 to 180 μm. The conditions for the aforementioned spray drying may be adjusted appropriately to ensure that the particle size distribution for the obtained catalyst satisfies the desired range.

Subsequently, the dried material (catalyst precursor) is calcined in the calcination step, thus yielding a composite oxide catalyst containing at least iron and antimony. This calcination step results in the formation of the desired catalyst structure and ensures the required catalytic activity is realized.

In the present invention, the calcination is preferably performed in two or more stages. Performing the calcination in two or more stages can sometimes improve the yield of the target product.

If the final calcination stage is termed the "final calcination" and the calcination performed prior to the final calcination is termed the "preliminary calcination", then the lower limit for the temperature of the final calcination is preferably 550° C., and more preferably 570° C., whereas the upper limit is preferably 1,100° C., and more preferably 1,000° C. If the temperature for the final calcination is lower than the lower limit, then a satisfactory catalytic performance may not be realized, and the yield of the target product may deteriorate. In contrast, if the temperature of the final calcination is higher than the upper limit, then the yield of the target product may deteriorate, and the catalytic activity may also deteriorate. Furthermore, if the temperature of the final calcination is higher than the upper limit, then the ammonia combustibility increases markedly in the ammoxidation reaction, and the ammonia unit consumption may decrease undesirably.

The lower limit for the time of the final calcination is preferably 0.1 hours, and more preferably 0.5 hours. If the time of the final calcination is shorter than this lower limit, then satisfactory catalytic performance may not be realized, and the yield of the target product may deteriorate. There are no particular limitations on the upper limit for the time of the final calcination, but because the effects obtained remain constant once the time is extended beyond a certain level, the upper limit is typically not more than 20 hours.

On the other hand, the lower limit for the temperature of the preliminary calcination is preferably 160° C., and more preferably 180° C., whereas the upper limit is preferably 520° C., and more preferably 500° C. Further, the temperature of the preliminary calcination is preferably 50 to 400° C. lower than the temperature of the final calcination.

The lower limit for the time of the preliminary calcination is preferably 0.1 hours, and more preferably 0.5 hours. If the time of the preliminary calcination is shorter than this lower limit, then satisfactory catalytic performance may not be realized, and the yield of the target product may deteriorate. There are no particular limitations on the upper limit for the time of the preliminary calcination, but because the effects obtained remain constant once the time is extended beyond a certain level, the upper limit is typically not more than 20 hours.

A general-purpose kiln can be used for the final calcination and the preliminary calcination. In those cases where the composite oxide catalyst produced using the catalyst production process of the present invention is a fluidized bed catalyst, the use of a rotary kiln or fluidized bed calciner is particularly desirable.

The gas atmosphere employed during the final calcination and the preliminary calcination may be either an oxidizing gas atmosphere containing oxygen, or an inert gas atmosphere of nitrogen or the like. Usually, an air atmosphere is the most convenient.

The composite oxide catalyst produced using the catalyst production process of the present invention preferably has a composition represented by general formula (I) shown below.

$$Fe_{10}Sb_aA_bTe_cD_dE_eO_x \cdot (SiO_2)_y \qquad (I)$$

In general formula (I), Fe, Sb, Te and O represent iron, antimony, tellurium and oxygen respectively. A represents at least one element selected from the group consisting of vanadium, molybdenum and tungsten, D represents at least one element selected from the group consisting of magnesium, calcium, strontium, barium, titanium, zirconium, niobium, chromium, manganese, cobalt, nickel, copper, silver, zinc, boron, aluminum, gallium, indium, thallium, germanium, tin, lead, phosphorus, arsenic and bismuth, E represents at least one element selected from the group consisting of lithium, sodium, potassium, rubidium and cesium, and $SiO_2$ represents silica.

The subscripts a, b, c, d, e, x and y represent atomic ratios. The lower limit for a is preferably 3, and more preferably 5, whereas the upper limit is preferably 100, and more preferably 90. The lower limit for b is preferably 0.1, and more preferably 0.2, whereas the upper limit is preferably 15, and more preferably 14. The lower limit for c is preferably 0, and the upper limit is preferably 12, and more preferably 10. The lower limit for d is preferably 0, and the upper limit is preferably 50, and more preferably 40. The lower limit for e is preferably 0, and the upper limit is preferably 5, and more preferably 4.5. The lower limit for y is preferably 10, and more preferably 20, whereas the upper limit is preferably 200, and more preferably 180. x represents the atomic ratio for the amount of oxygen required to satisfy the valency of each of the other components excluding silica.

The composition of the catalyst can be confirmed by performing an elemental analysis by ICP (Inductively Coupled high-frequency Plasma) emission spectrometry, fluorescent X-ray spectroscopy or atomic absorption analysis or the like. In those cases where no highly volatile elements are used, the composition of the catalyst may also be calculated from the amount of each raw material used during production of the catalyst.

In those cases where the composition of the composite oxide catalyst produced by the catalyst production process of the present invention falls outside the ranges specified for the above general formula (I), the effects of the present invention may not be satisfactorily realized, as indicated by a decrease in the yield of the target product or a deterioration in the properties of the obtained catalyst.

In order to ensure that the composition of the catalyst satisfies the ranges specified for the general formula (I), the amount of each raw material added during the aqueous slurry preparation step, and the amount of any raw material added between the completion of the aqueous slurry preparation step and the drying step should be selected as appropriate. Further, in those cases where the catalyst is produced via a method that involves impregnation or the like of the catalyst following drying, the amount of the raw material added via this impregnation or the like must also be selected appropriately.

The composite oxide catalyst produced by the catalyst production process of the present invention preferably includes iron antimonate as a crystal phase. A number of compositions exist for iron antimonate, but $FeSbO_4$ is the most common (for example, see Japanese Unexamined Patent Application, First Publication No. Hei 04-118051). The existence of a crystal phase of iron antimonate can be confirmed by X-ray diffraction analysis.

In this description, the term "iron antimonate" includes not only pure iron antimonate, but also structures that include any of a variety of other elements in the form of a solid solution.

In order to prepare a composite oxide catalyst containing iron antimonate as a crystal phase, an aqueous slurry containing at least the iron component raw material, the antimony component raw material and nitrate ions is first prepared at a pH of 7 or lower, and the aqueous slurry is then subjected to a heat treatment.

The upper limit for the pH of the aqueous slurry subjected to the heat treatment is preferably 6, and more preferably 5. If the pH of the slurry exceeds the aforementioned upper limit, then the iron component tends to precipitate out of the aqueous slurry in the form of a hydroxide or the like, and as a result, either the production reaction for iron antimonate does not proceed, or the reaction rate slows markedly, making the process impractical.

Although there are no particular limitations on the lower limit for the pH of the above aqueous slurry, a pH of 1 or higher, and particularly a pH of 1.2 or higher, accelerates the nitric acid oxidation of antimony, and is therefore preferred.

The lower limit for the heat treatment temperature used during heat treatment of the pH-regulated aqueous slurry is 60° C., preferably 70° C., and more preferably 80° C. If the heat treatment temperature is lower than this lower limit, then either the production reaction for iron antimonate does not proceed, or the reaction rate slows markedly, making the process impractical.

There are no particular limitations on the upper limit for the heat treatment temperature, but the temperature is generally kept below the boiling point of the slurry at normal pressure, and for example, the heat treatment is typically conducted at a temperature of 120° C. or lower. If necessary, the aqueous slurry may be subjected to heat treatment under pressure at a temperature of 120° C. or higher.

Although there are no particular limitations on the lower limit for the heat treatment time, if the heat treatment time is too short, then the iron antimonate production reaction does not proceed to completion, and there is possibility that the properties and activity of the obtained catalyst may be unsatisfactory. Accordingly, the lower limit for the heat treatment time is preferably at least 30 minutes, and more preferably 60 minutes or longer.

Although there are no particular limitations on the upper limit for the heat treatment time, the performance of the catalyst does not improve once the treatment is extended beyond the required treatment time, and therefore the treatment time is usually not more than 10 hours.

According to the catalyst production process of the present invention, by controlling the particles sizes of the precipitated particles within the aqueous slurry within specific ranges, a composite oxide catalyst can be obtained that enables a target product to be produced in high yield. This composite oxide catalyst can be used favorably in the production of nitriles and the like by ammoxidation of organic compounds. Among the various ammoxidation reactions, the composite oxide catalyst is particularly effective for the production of acrylonitrile by ammoxidation of propylene, and the production of hydrocyanic acid by ammoxidation of methanol. In particular, when the composite oxide catalyst is used in the production of acrylonitrile, a high acrylonitrile yield can be obtained, which is very desirable.

When the composite oxide catalyst produced by the process of the present invention is used in the production of acrylonitrile by ammoxidation of propylene, the lower limit for the value of c in the aforementioned general formula (I) is preferably 0.1, and more preferably 0.3.

In order to produce nitriles and the like by ammoxidation of organic compounds using the composite oxide catalyst produced by the process of the present invention, a fluidized bed reactor is preferably used. This production of nitriles and the like can be performed by packing the composite oxide catalyst in the fluidized bed reactor, and then supplying a raw material gas containing the raw material organic compound, ammonia and oxygen to the catalyst layer.

There are no particular limitations on the raw material gas, but a raw material gas containing the organic compound/ammonia/oxygen in a ratio of 1/1.1 to 1.5/1.5 to 3 (molar ratio) is preferred.

It is usually convenient to use air as the oxygen source. The raw material gas may be diluted prior to use, either with an inert gas such as steam, nitrogen or carbon dioxide, or with a saturated hydrocarbon or the like, or the oxygen concentration of the raw material gas may be increased.

The reaction temperature of the ammoxidation reaction is preferably within a range from 370 to 500° C., and the reaction pressure is preferably within a range from normal pressure to 500 kPa.

The apparent contact time is preferably within a range from 0.1 to 20 seconds.

EXAMPLES

The present invention is described below in further detail using a series of examples and comparative examples, but the present invention is in no way limited by these examples.

In the following examples and comparative examples, the units "parts" represent "parts by weight".

The composition of each of the catalysts obtained in the examples and comparative examples was calculated from the amount of each raw material used in producing the catalyst.

Further, measurement of the particle sizes of the precipitated particles within the aqueous slurry, and testing of the activity of the catalyst obtained in each example were performed using the procedures described below.

[Measurement of Particle Size]

The aqueous slurry was dispersed in a water medium at a specific concentration, and a laser diffraction particle size distribution analyzer (LS13320, manufactured by Beckman Coulter, Inc.) was used to perform a measurement after approximately one minute of circulation, thus obtaining a volume-based particle size distribution. The particle size was calculated from the measured values of the obtained particle size distribution. The measurement conditions were as follows.

pump speed: 70
dispersion medium: water
dispersion medium refractive index: 1.333
optical model used: Garnett
PIDS (Polarization Intensity Differential Scattering) relative concentration: 40 to 60%

[Catalytic Activity Test]

In order to evaluated the activity of the catalyst, acrylonitrile was produced by ammoxidation of propylene using the procedure described below.

A fluidized bed reactor having a catalyst flow portion with an inner diameter of 55 mm and a height of 2,000 mm was packed with the catalyst such that the apparent contact time between the catalyst and the raw material gas was as shown in Table 2. The contact time was determined using the formula shown below.

Contact time (sec.)=catalyst volume based on apparent bulk density (mL)/supplied raw material gas flow rate under reaction conditions (mL/sec.)

Air was used as the oxygen source, and a raw material gas composed of propylene, ammonia and oxygen in a ratio of 1:1.1:2.3 (molar ratio) was fed through the catalyst layer at a gas linear velocity of 17 cm/second. The reaction pressure was set to 200 kPa, and the reaction temperature was set to 460° C.

Gas chromatography was used to quantify the reaction product, and the propylene conversion rate and acrylonitrile yield were determined 4 hours after the start of the reaction. The propylene conversion rate and the acrylonitrile yield were determined using the formulas shown below.

Propylene conversion rate (%)={(carbon mass of supplied propylene−carbon mass of unreacted propylene)/carbon mass of supplied propylene×100}

Acrylonitrile yield (%)=(carbon mass of produced acrylonitrile/carbon mass of supplied propylene)×100

The compositions of the catalysts obtained in the examples and comparative examples are shown in Table 1. The numerical values in Table 1 represent the atomic ratios of each of the elements.

Further, for each of the examples and comparative examples, the proportions, among the precipitated particles having a particle size of not less than 1 μm but less than 150 μm contained within the aqueous slurry supplied to the drying step, of the precipitated particles having a particle size of not less than 1 μm but less than 10 μm, and the precipitated particles having a particle size of not less than 10 μm but less than 150 μm, as well as the final calcination conditions (temperature, time) used in the calcination step, and the conditions and results for the catalytic activity test are shown in Table 2.

Example 1

A catalyst having the composition shown in Table 1 was prepared using the procedure described below.

First, 70.4 parts of copper powder was dissolved in 4,000 parts of 63% by weight nitric acid. 3,700 parts of pure water were added to the solution, and following subsequent heating to 60° C., 309.4 parts of electrolytic iron powder and 155.5 parts of tellurium powder were added gradually to the solution and dissolved (liquid A).

In separate preparations, a solution was prepared by dissolving 72.3 parts of ammonium paratungstate in 2,000 parts of pure water (liquid B), and another solution was prepared by dissolving 19.6 parts of ammonium paramolybdate in 50 parts of pure water (liquid C).

Subsequently, with the liquid A undergoing stirring at a rotational rate of 250 rpm, 9,985 parts of a 20% by weight silica sol, 2,018.6 parts of antimony trioxide powder, the liquid B and the liquid C were added sequentially to the liquid A to obtain an aqueous slurry.

With continued stirring at a rotational rate of 250 rpm, 15% by weight ammonia water was added dropwise to the aqueous slurry to adjust the pH to 2.2, and the resulting aqueous slurry was then subjected to a heat treatment under reflux conditions at 98° C. for 3 hours.

Following completion of the heat treatment, the aqueous slurry was cooled to 80° C., and 161.1 parts of nickel nitrate, 12.8 parts of 85% by weight phosphoric acid and 34.3 parts of boric acid were added sequentially to the slurry.

The thus obtained aqueous slurry was then subjected to a particle size reduction treatment using a homogenizer until, of the precipitated particles having a particle size of not less than 1 μm but less than 150 μm contained within the aqueous slurry, the proportion of precipitated particles having a particle size of not less than 1 μm but less than 10 μm was 62% by volume, and the proportion of precipitated particles having a particle size of not less than 10 μm but less than 150 μm was 38% by volume.

Following the particle size reduction treatment, the aqueous slurry was spray-dried with a spray dryer under conditions such that the temperature of the drying air was 330° C. at the dryer inlet and 160° C. at the dryer outlet, thus obtaining spherical dried particles. Subsequently, the obtained dried particles were calcined for 2 hours at 250° C. and 2 hours at 450° C., and then finally, were subjected to fluidized calcination for 3 hours at 800° C. using a fluidized bed calciner, thus yielding a catalyst.

The thus obtained catalyst was tested for activity.

Example 2

A catalyst having the composition shown in Table 1 was prepared using the procedure described below.

First, 53.9 parts of copper powder was dissolved in 5,200 parts of 63% by weight nitric acid. 4,000 parts of pure water were added to the solution, and following subsequent heating to 60° C., 473.5 parts of electrolytic iron powder was added gradually to the solution and dissolved. 173.9 parts of magnesium nitrate, 49.3 parts of cobalt nitrate and 4.3 parts of potassium nitrate were then added sequentially to the solution and dissolved (liquid D).

In separate preparations, a solution was prepared by dissolving 88.5 parts of ammonium paratungstate in 2,000 parts of pure water (liquid E), a solution was prepared by dissolving 59.9 parts of ammonium paramolybdate in 100 parts of pure water (liquid F), a solution was prepared by dissolving 9.9 parts of ammonium metavanadate in 100 parts of pure water (liquid G), and another solution was prepared by dissolving 38.9 parts of telluric acid in 200 parts of pure water (liquid H).

Subsequently, with the liquid D undergoing stirring at a rotational rate of 250 rpm, 10,186 parts of a 20% by weight silica sol, 1,853.5 parts of antimony trioxide powder, the liquid E and the liquid F were added sequentially to the liquid D to obtain an aqueous slurry.

With continued stirring at a rotational rate of 250 rpm, 15% by weight ammonia water was added dropwise to the aqueous slurry to adjust the pH to 2.5, and the resulting aqueous slurry was then subjected to a heat treatment under reflux conditions at 98° C. for 3 hours.

Following completion of the heat treatment, the aqueous slurry was cooled to 80° C., and the liquid G, the liquid H, and 104.8 parts of boric acid were added sequentially to the slurry.

The thus obtained aqueous slurry was subjected to an ultrasonic treatment until, of the precipitated particles having a particle size of not less than 1 μm but less than 150 μm contained within the aqueous slurry, the proportion of precipitated particles having a particle size of not less than 1 μm but less than 10 μm was 74% by volume, and the proportion of precipitated particles having a particle size of not less than 10 μm but less than 150 μm was 26% by volume.

Following the ultrasonic treatment, the aqueous slurry was spray-dried with a spray dryer under conditions such that the temperature of the drying air was 330° C. at the dryer inlet and 160° C. at the dryer outlet, thus obtaining spherical dried particles. Subsequently, the obtained dried particles were calcined for 2 hours at 250° C. and 2 hours at 450° C., and then finally, were subjected to fluidized calcination for 3 hours at 760° C. using a fluidized bed calciner, thus yielding a catalyst.

The thus obtained catalyst was tested for activity.

Example 3

A catalyst having the composition shown in Table 1 was prepared using the procedure described below.

First, 74.0 parts of copper powder was dissolved in 2,100 parts of 63% by weight nitric acid. 1,800 parts of pure water were added to the solution, and following subsequent heating to 60° C., 162.5 parts of electrolytic iron powder and 111.4 parts of tellurium powder were added gradually to the solution and dissolved. 11.6 parts of chromium nitrate, 16.7 parts of manganese nitrate and 38.9 parts of zirconium oxynitrate were then added sequentially to the solution and dissolved (liquid I).

In a separate preparation, a solution was prepared by dissolving 76.0 parts of ammonium paratungstate in 1,500 parts of pure water (liquid J).

Subsequently, with the liquid I undergoing stirring at a rotational rate of 10 rpm, 8,741 parts of a 20% by weight silica sol, 2,544.8 parts of antimony trioxide powder, and the liquid J were added sequentially to the liquid I to obtain an aqueous slurry.

With continued stiffing at a rotational rate of 10 rpm, 15% by weight ammonia water was added dropwise to the aqueous slurry to adjust the pH to 1.8, and the resulting aqueous slurry was then subjected to a heat treatment under reflux conditions at 98° C. for 3 hours.

Following completion of the heat treatment, the aqueous slurry was cooled to 80° C., and 16.8 parts of 85% by weight phosphoric acid was added to the slurry.

The thus obtained aqueous slurry was then aged at 48 hours at room temperature with continued stirring at a rotational rate of 10 rpm.

The thus obtained aqueous slurry was then subjected to a particle size reduction treatment using a homogenizer until, of the precipitated particles having a particle size of not less than 1 μm but less than 150 μm contained within the aqueous slurry, the proportion of precipitated particles having a particle size of not less than 1 μm but less than 10 μm was 55% by volume, and the proportion of precipitated particles having a particle size of not less than 10 μm but less than 150 μm was 45% by volume.

Following this particle size reduction treatment, the aqueous slurry was spray-dried with a spray dryer under conditions such that the temperature of the drying air was 330° C. at the dryer inlet and 160° C. at the dryer outlet, thus obtaining spherical dried particles. Subsequently, the obtained dried particles were calcined for 2 hours at 250° C. and 2 hours at 450° C., and then finally, were subjected to fluidized calcination for 3 hours at 730° C. using a fluidized bed calciner, thus yielding a catalyst.

The thus obtained catalyst was tested for activity.

Example 4

A catalyst having the composition shown in Table 1 was prepared using the procedure described below.

First, 87.0 parts of copper powder was dissolved in 2,800 parts of 63% by weight nitric acid. 2,500 parts of pure water were added to the solution, and following subsequent heating to 60° C., 254.8 parts of electrolytic iron powder and 87.3 parts of tellurium powder were added gradually to the solution and dissolved (liquid K).

In separate preparations, a solution was prepared by dissolving 47.6 parts of ammonium paratungstate in 1,000 parts of pure water (liquid L), and another solution was prepared by dissolving 40.3 parts of ammonium paramolybdate in 100 parts of pure water (liquid M).

Subsequently, with the liquid K undergoing stirring at a rotational rate of 250 rpm, 10,964 parts of a 20% by weight silica sol, 1,994.9 parts of antimony trioxide powder, the liquid L and the liquid M were added sequentially to the liquid K to obtain an aqueous slurry.

With continued stirring at a rotational rate of 250 rpm, 15% by weight ammonia water was added dropwise to the aqueous slurry to adjust the pH to 2.0, and the resulting aqueous slurry was then subjected to a heat treatment under reflux conditions at 98° C. for 3 hours.

Following completion of the heat treatment, the aqueous slurry was cooled to 80° C., and 66.3 parts of nickel nitrate, 27.1 parts of zinc nitrate, 21.0 parts of 85% by weight phosphoric acid and 14.1 parts of boric acid were added sequentially to the slurry.

The thus obtained aqueous slurry was then subjected to a particle size reduction treatment using a homogenizer until, of the precipitated particles having a particle size of not less than 1 μm but less than 150 μm contained within the aqueous slurry, the proportion of precipitated particles having a particle size of not less than 1 μm but less than 10 μm was 58% by volume, and the proportion of precipitated particles having a particle size of not less than 10 μm but less than 150 μm was 42% by volume.

Following this particle size reduction treatment, the aqueous slurry was spray-dried with a spray dryer under conditions such that the temperature of the drying air was 330° C. at the dryer inlet and 160° C. at the dryer outlet, thus obtaining spherical dried particles. Subsequently, the obtained dried particles were calcined for 2 hours at 250° C. and 2 hours at 450° C., and then finally, were subjected to fluidized calcination for 3 hours at 780° C. using a fluidized bed calciner, thus yielding a catalyst.

The thus obtained catalyst was tested for activity.

Comparative Example 1

A catalyst having the same composition as that of example 1 was produced in the same manner as that described for example 1.

However, when the aqueous slurry was subjected to the particle size reduction treatment using a homogenizer following addition of the boric acid, the treatment was conducted until, of the precipitated particles having a particle size of not less than 1 but less than 150 μm contained within the aqueous slurry, the proportion of precipitated particles having a particle size of not less than 1 μm but less than 10 μm was 94% by volume, and the proportion of precipitated particles having a particle size of not less than 10 μm but less than 150 μm was 6% by volume.

The obtained catalyst was tested for activity.

Comparative Example 2

A catalyst having the same composition as that of example 1 was prepared using the procedure described below.

First, 70.4 parts of copper powder was dissolved in 4,000 parts of 63% by weight nitric acid. 3,700 parts of pure water were added to the solution, and following subsequent heating to 60° C., 309.4 parts of electrolytic iron powder and 155.5 parts of tellurium powder were added gradually to the solution and dissolved (liquid N).

In separate preparations, a solution was prepared by dissolving 72.3 parts of ammonium paratungstate in 2,000 parts of pure water (liquid O), and another solution was prepared by dissolving 19.6 parts of ammonium paramolybdate in 50 parts of pure water (liquid P).

Subsequently, with the liquid N undergoing stirring at a rotational rate of 10 rpm, 9,985 parts of a 20% by weight silica sol, 2,018.6 parts of antimony trioxide powder, the liquid O and the liquid P were added sequentially to the liquid N to obtain an aqueous slurry.

With continued stirring at a rotational rate of 10 rpm, 10% by weight ammonia water was added dropwise to the aqueous slurry to adjust the pH to 2.2, and the resulting aqueous slurry was then subjected to a heat treatment under reflux conditions at 98° C. for 3 hours.

Following completion of the heat treatment, the aqueous slurry was cooled to 80° C., and 161.1 parts of nickel nitrate, 12.8 parts of 85% by weight phosphoric acid and 34.3 parts of boric acid were added sequentially to the slurry.

Stirring of the aqueous slurry was then halted, and the slurry was left to age at room temperature for 24 hours.

When the particle size distribution of the precipitated particles within the aged aqueous slurry was measured, of the precipitated particles having a particle size of not less than 1 μm but less than 150 μm contained within the aqueous slurry, the proportion of precipitated particles having a particle size of not less than 1 μm but less than 10 μm was 22% by volume, and the proportion of precipitated particles having a particle size of not less than 10 μm but less than 150 μm was 78% by volume.

The aqueous slurry was spray-dried with a spray dryer under conditions such that the temperature of the drying air was 330° C. at the dryer inlet and 160° C. at the dryer outlet, thus obtaining spherical dried particles. Subsequently, the obtained dried particles were calcined for 2 hours at 250° C. and 2 hours at 450° C., and then finally, were subjected to fluidized calcination for 3 hours at 800° C. using a fluidized bed calciner, thus yielding a catalyst.

The thus obtained catalyst was tested for activity.

Comparative Example 3

A catalyst having the same composition as that of example 3 was produced in the same manner as that described for example 3.

However, no particle size reduction treatment was performed on the aged aqueous slurry.

When the particle size distribution of the precipitated particles within the aged aqueous slurry was measured, of the precipitated particles having a particle size of not less than 1 μm but less than 150 μm contained within the aqueous slurry, the proportion of precipitated particles having a particle size of not less than 1 μm but less than 10 μm was 26% by volume, and the proportion of precipitated particles having a particle size of not less than 10 μm but less than 150 μm was 74% by volume.

The obtained catalyst was tested for activity.

Comparative Example 4

A catalyst having the same composition as that of example 3 was prepared using the procedure described below.

First, 74.0 parts of copper powder was dissolved in 2,100 parts of 63% by weight nitric acid. 1,800 parts of pure water were added to the solution, and following subsequent heating to 60° C., 162.5 parts of electrolytic iron powder and 111.4 parts of tellurium powder were added gradually to the solution and dissolved. 11.6 parts of chromium nitrate, 16.7 parts of manganese nitrate and 38.9 parts of zirconium oxynitrate were then added sequentially to the solution and dissolved (liquid Q).

In a separate preparation, a solution was prepared by dissolving 76.0 parts of ammonium paratungstate in 1,500 parts of pure water (liquid R).

Subsequently, with the liquid Q undergoing stirring at a rotational rate of 10 rpm, 8,741 parts of a 20% by weight silica sol, 2,544.8 parts of antimony trioxide powder, and the liquid R were added sequentially to the liquid Q to obtain an aqueous slurry.

With continued stirring at a rotational rate of 10 rpm, 15% by weight ammonia water was added dropwise to the aqueous slurry to adjust the pH to 1.8, and the resulting aqueous slurry was then subjected to a heat treatment under reflux conditions at 98° C. for 3 hours.

Following completion of the heat treatment, the aqueous slurry was cooled to 80° C., and 16.8 parts of 85% by weight phosphoric acid was added to the slurry.

The thus obtained aqueous slurry was then subjected to a particle size reduction treatment using a homogenizer until, of the precipitated particles having a particle size of not less than 1 μm but less than 150 μm contained within the aqueous slurry, the proportion of precipitated particles having a particle size of not less than 1 μm but less than 10 μm was 95% by volume, and the proportion of precipitated particles having a particle size of not less than 10 μm but less than 150 μm was 5% by volume.

Following this particle size reduction treatment, the aqueous slurry was spray-dried with a spray dryer under conditions such that the temperature of the drying air was 330° C. at the dryer inlet and 160° C. at the dryer outlet, thus obtaining spherical dried particles. Subsequently, the obtained dried particles were calcined for 2 hours at 250° C. and 2 hours at 450° C., and then finally, were subjected to fluidized calcination for 3 hours at 730° C. using a fluidized bed calciner, thus yielding a catalyst.

The thus obtained catalyst was tested for activity.

TABLE 1

| | Catalyst composition (atomic ratio) | | | | | | | | | | | | | | |
|---|---|---|---|---|---|---|---|---|---|---|---|---|---|---|---|
| | Fe | Sb | A | | | Te | | D | | | | E | | SiO$_2$ |
| Example 1 | 10 | 25 | Mo 0.2 | W 0.5 | | 2.2 | Cu 2 | Ni 1 | P 0.2 | B 1 | | | | 60 |
| Example 2 | 10 | 15 | Mo 0.4 | W 0.4 | V 0.1 | 0.2 | Cu 1 | Mg 0.8 | Co 0.2 | B 2 | | K 0.05 | | 40 |
| Example 3 | 10 | 60 | W 1 | | | 3 | Cu 4 | Cr 0.1 | Mn 0.2 | Zr 0.5 | P 0.5 | | | 100 |
| Example 4 | 10 | 30 | Mo 0.5 | W 0.4 | | 1.5 | Cu 3 | Ni 0.5 | Zn 0.2 | P 0.4 | B 0.5 | | | 80 |
| Comparative example 1 | 10 | 25 | Mo 0.2 | W 0.5 | | 2.2 | Cu 2 | Ni 1 | P 0.2 | B 1 | | | | 60 |
| Comparative example 2 | 10 | 25 | Mo 0.2 | W 0.5 | | 2.2 | Cu 2 | Ni 1 | P 0.2 | B 1 | | | | 60 |
| Comparative example 3 | 10 | 60 | W 1 | | | 3 | Cu 4 | Cr 0.1 | Mn 0.2 | Zr 0.5 | P 0.5 | | | 100 |
| Comparative example 4 | 10 | 60 | W 1 | | | 3 | Cu 4 | Cr 0.1 | Mn 0.2 | Zr 0.5 | P 0.5 | | | 100 |

TABLE 2

| | Particle size distribution of precipitated particles in aqueous slurry | | Final calcination conditions | | Activity test | | |
|---|---|---|---|---|---|---|---|
| | Proportion of precipitated particles of at least 1 μm but less than 10 μm [vol %] | Proportion of precipitated particles of at least 10 μm but less than 150 μm [vol %] | Calcination temperature [° C.] | Calcination time [hours] | Contact time [sec.] | Propylene conversion rate [%] | Acrylonitrile yield [%] |
| Example 1 | 62 | 38 | 800 | 3 | 2.7 | 98.4 | 82.4 |
| Example 2 | 74 | 26 | 740 | 3 | 3.2 | 98.0 | 81.4 |
| Example 3 | 55 | 45 | 730 | 3 | 3.0 | 97.8 | 81.0 |
| Example 4 | 58 | 42 | 780 | 3 | 2.6 | 98.1 | 82.0 |

TABLE 2-continued

| | Particle size distribution of precipitated particles in aqueous slurry | | Final calcination conditions | | Activity test | | |
|---|---|---|---|---|---|---|---|
| | Proportion of precipitated particles of at least 1 μm but less than 10 μm [vol %] | Proportion of precipitated particles of at least 10 μm but less than 150 μm [vol %] | Calcination temperature [° C.] | Calcination time [hours] | Contact time [sec.] | Propylene conversion rate [%] | Acrylonitrile yield [%] |
| Comparative example 1 | 94 | 6 | 800 | 3 | 2.7 | 99.7 | 81.1 |
| Comparative example 2 | 22 | 78 | 800 | 3 | 2.7 | 97.2 | 80.4 |
| Comparative example 3 | 26 | 74 | 780 | 3 | 2.6 | 95.8 | 79.2 |
| Comparative example 4 | 95 | 5 | 780 | 3 | 2.6 | 99.5 | 79.6 |

As is evident from Table 2, the composite oxide catalysts obtained in examples 1 to 4 were each able to produce acrylonitrile in high yield.

In contrast, although the composite oxide catalysts obtained in comparative examples 1 and 2 had the same composition as the composite oxide catalyst obtained in example 1, the yield of acrylonitrile was lower than that observed in example 1.

Further, although the composite oxide catalysts obtained in comparative examples 3 and 4 had the same composition as the composite oxide catalyst obtained in example 3, the yield of acrylonitrile was lower than that observed in example 3.

INDUSTRIAL APPLICABILITY

According to the present invention, a composite oxide catalyst is obtained that can produce a target product in high yield. Accordingly, the present invention is extremely useful industrially.

The invention claimed is:

1. A process for producing a composite oxide catalyst, the process comprising:
   (i) preparing an aqueous slurry comprising iron and antimony,
   (ii) subjecting the aqueous slurry to a particle size reduction treatment while measuring particle size of precipitated particles in the aqueous slurry,
   (iii) drying the aqueous slurry to obtain a dried material, and
   (iv) calcining the dried material, thereby obtaining the composite oxide catalyst,
   wherein
   the aqueous slurry comprises precipitated particles having a particle size of not less than 1 μm but less than 150 μm,
   a proportion of precipitated particles having a particle size of not less than 1 μm but less than 10 μm in the aqueous slurry is from 40 to 90% by volume as measured after the particle size reduction treatment,
   a proportion of precipitated particles having a particle size of not less than 10 μm but less than 150 μm in the aqueous slurry is from 10 to 60% by volume as measured after the particle size reduction treatment, and
   the composite oxide catalyst comprises a composition of formula (I):

$$Fe_{10}Sb_aA_bTe_cD_dE_eO_x\cdot(SiO_2)_y \qquad (I),$$

wherein:
A is at least one element selected from the group consisting of vanadium, molybdenum and tungsten;
D is at least one element selected from the group consisting of magnesium, calcium, strontium, barium, titanium, zirconium, niobium, chromium, manganese, cobalt, nickel, copper, silver, zinc, boron, aluminum, gallium, indium, thallium, germanium, tin, lead, phosphorus, arsenic and bismuth;
E is at least one element selected from the group consisting of lithium, sodium, potassium, rubidium and cesium; and
a, b, c, d, e, x and y are atomic ratios, wherein a is 3 to 100, b is 0.1 to 1, c is 0.2 to 12, d is 0 to 50, e is 0 to 5, y is 10 to 200; and x is an atomic ratio for an amount of oxygen required to satisfy valency of other components excluding silica.

2. The process of claim 1, wherein
the proportion of the precipitated particles having the particle size of not less than 1 μm but less than 10 μm is from 45 to 85% by volume as measured after the particle size reduction treatment, and
the proportion of the precipitated particles having the particle size of not less than 10 μm but less than 150 μm is from 15 to 55% by volume as measured after the particle size reduction treatment.

3. The process of claim 1, wherein the dried material comprises particles having a particle size of from 5 to 200 μm.

4. The process of claim 1, wherein the dried material comprises particles having a particle size of from 10 to 180 μm.

5. The process of claim 1, wherein the calcining (iv) comprises a preliminary calcination and a final calcination.

6. The process of claim 5, wherein a temperature of the preliminary calcination is 50 to 400° C. lower than a temperature of the final calcination.

7. The process of claim 5, wherein a temperature of the preliminary calcination is from 180 to 500° C.

8. The process of claim 5, wherein a time of the preliminary calcination is at least 0.5 hours.

9. The process of claim 5, wherein a temperature of the final calcination is from 570 to 1,000° C.

10. The process of claim 5, wherein a time of the final calcination is at least 0.5 hours.

11. The process of claim 1, wherein the measuring a particle size of precipitated particles in the aqueous slurry is conducted in accordance with laser diffraction methods, dynamic scattering methods, centrifugation methods, or electrical detection methods.

12. The process of claim 1, wherein the aqueous slurry comprises precipitated particles having a particle size of 150 µm or more is not more than 5% by volume, relative to the volume of the precipitated particles having a particle size of not less than 1 µm but less than 150 µm.

* * * * *